US006426780B1

(12) United States Patent
Limberg et al.

(10) Patent No.: US 6,426,780 B1
(45) Date of Patent: Jul. 30, 2002

(54) DTV RECEIVER WITH LOW-BAND FINAL I-F SIGNAL FILTERED FOR SUPPRESSING CO-CHANNEL INTERFERING NTSC AUDIO CARRIER

(75) Inventors: Allen LeRoy Limberg, Vienna, VA (US); Chandrakant B. Patel, Hopewell, NJ (US)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/396,799

(22) Filed: Sep. 15, 1999

Related U.S. Application Data
(60) Provisional application No. 60/104,195, filed on Oct. 14, 1998.

(51) Int. Cl.[7] .............................. H04N 5/38; H04N 5/21; H04N 5/44; H04N 5/213; H04N 5/217; H04N 5/50; H04B 1/10; H03C 3/00; H03D 1/06; H03D 1/04

(52) U.S. Cl. .................. 348/725; 348/607; 348/470; 348/21; 348/735; 348/738; 348/736; 375/346; 375/348; 375/349; 375/350; 375/277; 375/285; 455/307; 455/315; 455/286

(58) Field of Search ...................... 348/21, 470, 607, 348/725, 735–8, 731; 375/346, 348, 349, 350, 277, 285; 455/307, 315, 286

(56) References Cited

U.S. PATENT DOCUMENTS

| | | | | |
|---|---|---|---|---|
| 5,283,653 A | * | 2/1994 | Citta | 348/725 |
| 5,325,188 A | * | 6/1994 | Scarpa | 348/624 |
| 5,357,284 A | * | 10/1994 | Todd | 348/486 |
| 5,408,262 A | * | 4/1995 | Kim et al. | 348/21 |
| 5,572,249 A | * | 11/1996 | Ghosh | 348/21 |
| 5,574,496 A | * | 11/1996 | Nielsen et al. | 348/21 |
| 5,606,579 A | * | 2/1997 | Patel et al. | 375/321 |
| 5,648,822 A | * | 7/1997 | Hulyalkar | 348/607 |
| 5,659,372 A | * | 8/1997 | Patel et al. | 348/731 |
| 5,731,848 A | * | 3/1998 | Patel et al. | 348/614 |
| 5,745,187 A | * | 4/1998 | Hulyalkar et al. | 348/607 |
| 5,793,417 A | * | 8/1998 | Lee | 348/21 |
| 5,801,790 A | * | 9/1998 | Limberg | 348/21 |
| 5,841,484 A | * | 11/1998 | Hulyalkar et al. | 348/607 |
| 5,852,476 A | * | 12/1998 | Limberg | 348/725 |
| 6,052,158 A | * | 4/2000 | Nielsen | 348/725 |
| 6,057,877 A | * | 5/2000 | Limberg | 348/21 |
| RE36,992 E | * | 12/2000 | Citta et al. | 348/21 |
| 6,184,921 B1 | * | 2/2001 | Limberg | 348/21 |
| 6,201,576 B1 | * | 3/2001 | Raghunath et al. | 348/558 |

* cited by examiner

Primary Examiner—John W. Miller
Assistant Examiner—Paulos M. Natnael
(74) Attorney, Agent, or Firm—Sughrue Mion, PLLC

(57) ABSTRACT

A digital television receiver converts very-high-frequency intermediate-frequency digital television signal to a band with uppermost frequency in the lower portion of the high-frequency range. This facilitates RLC analog filtering, such as a Butterworth-Thomson-transition filter or a bridged-T trap filter, being used for suppressing the frequency-modulated audio carrier of co-channel NTSC analog television signal prior to the digital television signal being synchrodyned to baseband for recovering symbol code. The delay distortion introduced by this analog filtering is compensated for in substantial part in surface-acoustic-wave bandpass filtering of the very-high-frequency intermediate-frequency digital television signals. Remnant delay distortion is reduced by channel equalization filtering carried out in the digital regime.

40 Claims, 8 Drawing Sheets

DTV RECEIVER WITH LOW-BAND FINAL I-F SIGNAL FILTERED FOR SUPPRESSING CO-CHANNEL INTERFERING NTSC AUDIO CARRIER

This application is filed under 35 U.S.C. 111(a) claiming pursuant to 35 U.S.C. 119(e)(1) benefit of the filing date of provisional application serial No. 60/104,195 filed pursuant to 35 U.S.C. 111(b) on Oct. 14, 1998.

The invention relates to digital television receivers for vestigial-sideband (VSB) digital television (DTV) signals and, more particularly, to the suppression of interference with DTV signal reception caused by the frequency-modulated audio carrier of a co-channel NTSC analog television signal.

BACKGROUND OF THE INVENTION

The VSB DTV signals that are broadcast in the United States are transmitted in the same channels used for broadcasting NTSC analog television signals. Generally speaking, the VSB DTV signals are broadcast at lower power than NTSC analog television signals are. Until such time as DTV broadcasting completely supplants NTSC analog television broadcasting, then, there is substantial possibility of co-channel NTSC interference with VSB DTV signal reception, particularly during the summer months. The video carrier modulation components of a co-channel NTSC signal overlap a VSB DTV signal in frequency, which makes the suppression of these video components by frequency selective filtering a difficult task. The current content of the video portion of a co-channel NTSC signal can be predicted quite well from its previous content, however, which facilitates comb filtering to suppress artifacts of the video portion of a co-channel NTSC signal that accompany baseband symbol code detected from the received VSB DTV signal. Prediction of the current content of the audio portion of a co-channel NTSC signal from its previous content is generally more difficult, although short-time prediction of the audio portion is possible based on considerations of continuity in a narrowband signal. The audio carrier modulation of a co-channel NTSC signal does not overlap a VSB DTV signal in frequency, which makes it more feasible to employ frequency-selective filtering to suppress the audio portion of a co-channel NTSC signal than to suppress the video portion.

There has been great concern with carefully controlling the overall amplitude and phase characteristics of the VSB DTV receiver in order to minimize intersymbol error, while at the same time rejecting interference from signals in adjacent channels. Generally, the overall response of the receiver is defined by surface-acoustic-wave (SAW) filtering done using gallium-arsenide devices in internediate-frequency amplifiers for the ultra-high-frequency (UHF) band or using lithium-niobate devices in intermediate-frequency amplifiers for the very-high-frequency (VHF) band. Getting flat amplitude response within ±1 dB over a bandwidth of 5.5 to 6 MHz, while maintaining acceptable group delay characteristics, requires SAW filtering with a great number of poles and zeroes to define the receiver bandwidth. It is difficult and expensive to implement such SAW filtering for a VHF band, such as 41–47 MHz. Also, the insertion loss is quite high in a VHF band, typically 15–17 dB for the 41 to 47 MHz band. The SAW filtering to define receiver bandwidth is more easily implemented for a UHF band, such as at 917–923 MHz, as long as care is taken to drive the SAW filter from the optimal source impedance specified by its manufacturer. This is because the Δf/f ratio of 6 MHz to 920 MHz is substantially lower than the Δf/f ratio of 6 MHz to 44 MHz. Insertion losses also tend to be lower in a UHF band, typically 10–12 dB for the 917 to 923 MHz band.

The cost of a SAW filter used in a UHF or VHF I-F amplifier is substantially increased if it is designed to provide trap filtering for the modulated audio carrier of the co-channel NTSC signal. Since the co-channel NTSC signal is 250 kilohertz from the edge of the television channel, and since critical VSB DTV information extends to within 310 kilohertz of that edge of the television channel, the SAW filter response must reach substantial attenuation in less than a 60 kilocycle range. This is a very difficult requirement to fulfill.

Consequently, trap filtering for the modulated audio carrier of the co-channel NTSC signal is omitted in some DTV receiver designs, and the artifacts of co-channel interference from this carrier are suppressed to some extent by comb filtering performed in the digital regime for reducing artifacts of co-channel interference from the video portion of the NTSC signal. Co-channel interference from the audio portion of the NTSC signal is not suppressed very much unless the comb filtering used to suppress co-channel interference from the video portion of the NTSC signal subtractively combines samples differentially delayed by twelve symbol epochs. Often, however, comb filtering of different type would better suppress co-channel interference from the video portion of the NTSC signal.

So cheaper and better filtering for suppressing co-channel interference from the audio portion of the NTSC signal is a desideratum. It is pointed out in this specification that such filtering is possible in DTV signal receivers in which a low-band final I-F signal with its uppermost frequency in the low or mid high-frequency band is generated and synchrodyned to baseband for recovering symbol code. RLC analog filtering of such an I-F signal can be done to suppress co-channel interference from the audio portion of the NTSC signal. Examples of suitable RLC analog filtering are Butterworth-Thomson transition filters, bridged-T trap filters and bifilar-T trap filters.

Non-uniform group delay attends RLC analog filtering, so designers eschew LC analog filtering in favor of digital filter designs with which uniform group delay can be easily obtained. The non-uniform group delay from LC analog filtering can be substantially compensated by non-uniform group delay designed into SAW filtering used for the VHF I-F signal or SAW filtering used for the UHF I-F signal, however. The inclusion of such delay compensation into such a SAW filter is not expensive. Remaining non-uniformity in group delay is easily remedied by the adaptive channel equalization filtering customarily incorporated into DTV signal receivers. So combinations of LC analog filtering low-band intermediate-frequency DTV signals with preceding SAW filtering of higher-intermediate-frequency DTV signals designed to result in overall group delay that is reasonably uniform can provide the desired cheaper and better filtering for suppressing co-channel interference from the audio portion of the NTSC signal.

RLC filters with maximally flat amplitude characteristics are described by S. Butterworth in a paper "On the Theory of Filter-Amplifiers" in EXP. WIRELESS AND WIRELESS ENG., Vol. 7, p. 536, October 1930. RLC filters with maximally flat delay characteristics are described by W. E. Thomson, M. A., in a paper "Networks with Maximally-Flat Delay" in WIRELESS ENGINEER, Vol. 29, pp. 256–263, October 1952. RLC filters with characteristics intermediate to those of Butterworth and Thomson filters, which transitional filters have better transient response characteristics than Butterworth or Thomson filters are described by Y. Peless and T. Murakami in a paper "Analysis and Synthesis of Transitional Butterworth-Thomson Filters and Bandpass Amplifiers" in the March 1957 issue of RCA REVIEW pp. 60–94. The bridged-T trap filter is described by F. E. Terman, Sc. D., in RADIO ENGINEERS" HANDBOOK, $1^{st}$. Ed., §13, §§7, pp. 918–920, copyright 1943 to McGraw Hill Book Co., Inc. of New York and London. The procedures for designing bifilar-T traps are known to television engineers from a licensee bulletin LB-961 titled "An Analysis of the Bifilar-T Trap Circuit" supplied by Radio Corporation of America through its Industry Service Laboratory to television receiver licensees on Sep. 16, 1954.

The conversion of very-high-frequency intermediate-frequency VSB DTV signal to a band below 10 MHz for digitization and its subsequent demodulation in the digital regime are described in U.S. Pat. No. 5,479,449. This patent entitled "DIGITAL VSB DETECTOR WITH BANDPASS PHASE TRACKER, AS FOR INCLUSION IN AN HDTV RECEIVER" issued Dec. 26, 1995 to C. B. Patel and A. L. R. Limberg. Demodulation in the digital regime is performed in U.S. Pat. No. 5,479,449 by converting the digitized internediate-frequency VSB DTV signal to complex form, to be multiplied in a complex digital multiplier by a complex digital carrier signal supplied from look-up tables stored in read-only memory (ROM). To facilitate converting the digitized I-F signal to complex form using a digital Hilbert transform filter, the final intermediate-frequency band is offset a megahertz or so from zero frequency, but its uppermost frequency is kept in the lower portion of the high-frequency (HF) band extending from 3 to 30 MHz.

Equalization of the digitized baseband symbol coding that results from demodulation is facilitated by choosing a sampling clock of a rate that is related to symbol rate by a whole number ratio and that will satisfy the Nyquist criterion. Supplying the complex digital carrier signal from ROM is facilitated by choosing the carrier in the digitized I-F signal to be a submultiple of the system clock signal rate as described by C. B. Patel and A. L. R. Limberg in U.S. Pat. No. 5,606,579 issued Feb. 25, 1997 and entitled "DIGITAL VSB DETECTOR WITH FINAL I-F CARRIER AT SUBMULTIPLE OF SYMBOL RATE, AS FOR HDTV RECEIVER". Such choice of carrier permits perfect wrap-around of cycles of digital carrier when they are conceived as being mapped to the surface of a cylinder with circumference measured by ROM addresses according to a modular arithmetic.

C. B. Patel and A. L. R. Limberg advocate the digital carrier being located at the upper-frequency end of the final I-F signal band in U.S. Pat. No. 5,731,848 issued Mar. 24, 1998 and entitled "DIGITAL VSB DETECTOR WITH BANDPASS PHASE TRACKER USING NG FILTERS, AS FOR USE IN AN HDTV RECEIVER". That is, the vestigial sideband is above full sideband in frequency in the final I-F signal that is digitized. U.S. Pat. No. 5,731,848 discloses there is reason for this choice of carrier, aside from facilitating the use of Ng filters for converting the real final I-F signal to complex form after its digitization. Fast changes in symbol values are converted to lower-frequency variations in the final I-F signal offered for digitization, which alleviates problems of accurately sampling the final I-F signal as the initial step in digitization. Small changes in sampling phase result in larger changes in the zero-frequency demodulated carrier, so there is tighter automatic frequency and phase control (AFPC) of a local oscillator used in converting the radio-frequency (R-F) VSB DTV signal to the final I-F signal.

The inventors discern that selective filtering of an I-F signal to suppress any co-channel NTSC audio carrier component of the I-F signal accompanying its DTV signal component is substantially easier if the frequency of the I-F signal is as low as possible. In a DTV receiver that converts VHF I-F signal to a low-band I-F signal with uppermost frequency in the lower portion of the high-frequency (HF) range extending from 3 to 30 MHz, the formidable problem of trapping co-channel NTSC audio carrier component in a UHF or VHF I-F signal can be simply avoided, the inventors point out. This is done by selectively filtering the low-band I-F signal for suppressing any co-channel NTSC audio carrier component therein. Since the $\Delta f/f$ ratio of the few tens of kilohertz $\Delta f$ range over which the filter must exhibit cut-off is a smaller fraction of the frequency f at the center of passband,.a SAW filter that traps co-channel NTSC audio carrier component of the low-band I-F signal without severely affecting its DTV signal response can be practically constructed. Alternatively, resistance-inductance-capacitance (RLC) analog filtering can be used for trapping the co-channel NTSC audio carrier component of the low-band I-F signal.

SUMMARY OF THE INVENTION

A digital television receiver embodying the invention converts very-high-frequency intermediate-frequency digital television (DTV) signal to a low-band intermediate-frequency signal with uppermost frequency in the lower portion of the high-frequency (HF) range extending from 3 to 30 MHz , selectively filters the low-band intermediate-frequency signal to suppress any co-channel NTSC audio carrier accompanying the DTV signal, and synchrodynes the selectively filtered low-band intermediate-frequency signal to baseband for recovering symbol code.

Certain digital television receivers embodying the invention employ RLC analog filtering for suppressing the frequency-modulated audio carrier of co-channel interfering NTSC analog television signal in the final I-F signal that is synchrodyned to baseband for recovering symbol code. The delay distortion introduced by this analog filtering is compensated for in substantial part in surface-acoustic-wave (SAW) bandpass filtering of the very-high-frequency intermediate-frequency digital television signals. Remnant delay distortion is reduced by channel equalization filtering carried out in the digital regime.

Other digital television receivers embodying the invention employ a surface-acoustic-wave filter for the low-band intermediate-frequency signal, to suppress any co-channel NTSC audio carrier component of this low-band I-F signal accompanying the DTV signal component of this low-band I-F signal.

DETAILED DESCRIPTION OF THE PREFERRED EMBODIMENTS

Figure 1:
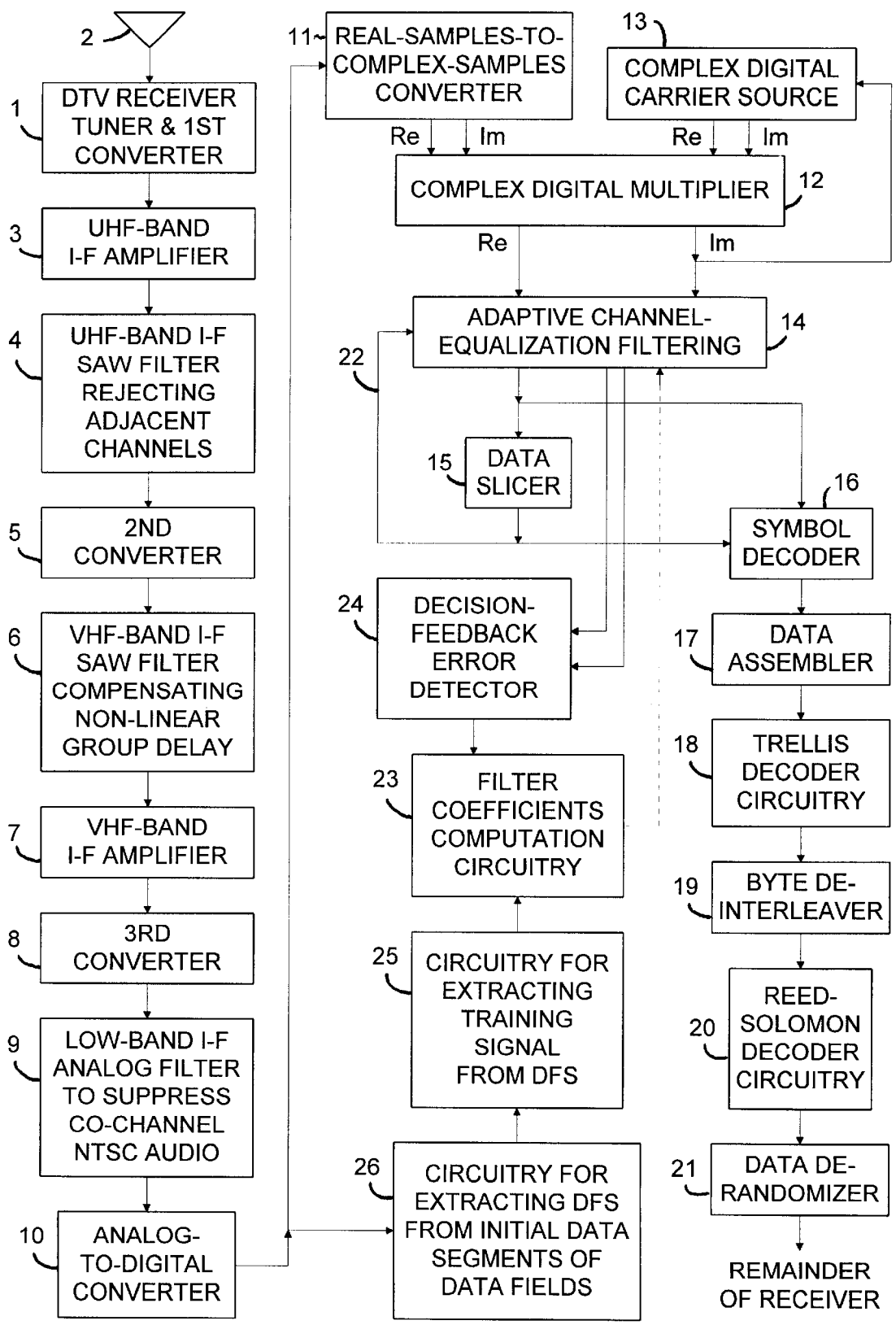
FIG. 1 is a schematic diagram of a DTV signal receiver that in accordance with the invention filters low-band final-intermediate-frequency signal to suppress co-channel interfering NTSC audio signal therefrom and digitizes the filtered final I-F signal for synchrodyning to baseband in the digital regime.

FIG. 1 shows a DTV signal receiver that synchrodynes low-band final-intermediate-frequency signals to baseband in the digital regime. The FIG. 1 DTV signal receiver includes tuner and first converter circuitry 1 for generating an ultra-high-frequency (UHf) intermediate-frequency (I-F) signal in response to received broadcast DTV signals. FIG. 1 shows a broadcast receiving antenna 2 arranged to capture the DTV signals for the tuner and first converter circuitry 1. Alternatively, the tuner and first converter circuitry 1 can be connected for receiving DTV signals from a narrowcast receiving antenna or from a cablecast transmission system.

The tuner and first (frequency) converter circuitry 1 is similar to that used in prior-art DTV signal receivers. The tuner input has a bandpass filter that limits the frequency range of radio-frequency input signals to the 50 to 810 MHz band, rejecting image frequencies above 920 MHz. The tuner also includes a broadband tracking filter that rejects television signals other than that selected for viewing, especially those signals of higher power such as analog TV signals in next-to-adjacent channels. The first converter includes a first local oscillator tunable over a range from 970 to 1730 MHz to place the initial I-F signal in a 6-MHz-wide band with the carrier nominally at 920 MHz. These local oscillator frequencies are such that any leakage from the tuner input will not interfere with UHF TV channels as may be received by another television signal receiver nearby. At the same time second harmonics of UHF TV channels 14 through 69 fall above the initial I-F band. The mixer in the first converter is a highly linear doubly-balanced type to avoid even harmonic generation. There is a broadband tuned coupling for rejecting image frequencies in output signal from the tuner and first converter circuitry 1, which output signal is supplied to an intermediate-frequency amplifier 3 as its input signal.

The I-F amplifier 3 supplies amplified UHF I-F signal for driving a first surface-acoustic-wave (SAW) filter 4. A SAW filter for these frequencies is usually constructed on a gallium arsenide substrate. The I-F amplifier 3 drives the SAW filter 4 from the source impedance prescribed for avoiding multiple reflections that interfere with obtaining good group delay and provides constant, linear gain to overcome the 10–12 dB insertion loss in the SAW filter 4. The upconversion to the UHF intermediate frequencies facilitates the SAW filter 4 having a large number of poles and zeroes. The SAW filter 4 has a −1 dB to −1 dB bandwidth 5.5 to 6 MHz wide, and its passband is designed to pass those frequencies obtained by converting to the UHF I-F band those frequencies extending from the lower limit frequency of the television channel up to the upper limit frequency of the television channel. The SAW filter 4 determines the overall bandwidth of the DTV receiver, suppressing response to adjacent channels.

A second (frequency) converter 5 heterodynes the response of the first SAW filter 4 with oscillations from a second local oscillator within the converter 5, to generate a response to DTV signal translated to a very-high-frequency (VHF) intermediate-frequency band below the frequencies assigned for television broadcasting. A second SAW filter 6 is used for rejecting the unwanted image frequencies that accompany the VHF downconversion result supplied from the second converter 5. The SAW filter 6 has flat amplitude response over a bandwidth of at least 6 MHz. The SAW filter 6 has a phase response designed for optimizing overall phase response for the DTV receiver up to the point that synchrodyning to baseband is completed.

The second converter 5 includes a linear mixer therein, which is designed to drive the SAW filter 6 from the source impedance prescribed for suppressing multiple reflections. The second converter 5 is preferably of a design that provides sufficient conversion gain to overcome insertion loss in the SAW filter 6. If the second converter 5 is of a design that does not provide substantial conversion gain, the gain in the UHF I-F amplifier 3 is increased to overcome insertion losses in both the SAW filters 4 and 6. Alternatively, an additional fixed-gain amplifier is included between the first SAW filter 4 and the second converter 5 to compensate for the insertion loss in the second SAW filter 6.

The VHF I-F signal supplied as the response of the second SAW filter 6 is applied as input signal to a very-high-frequency intermediate-frequency amplifier 7, which generates an amplified VHF I-F signal response to its input signal. The VHF I-F amplifier 7 is subject to reverse automatic gain control. In a third (frequency) converter 8 the VHF I-F amplifier 7 response is heterodyned with oscillations from a third local oscillator in a linear third mixer. The frequency of the oscillations from the third local oscillator is chosen such that the third mixer supplies a final intermediate-frequency signal response in a final intermediate-frequency band closer to baseband than the VHF I-F band. This final I-F band is low enough in frequency to make analog-to-digital conversion feasible. This final I-F band is offset a megahertz or so from baseband to facilitate the generation of complex digital signals in response to the final I-F signal.

In accordance with the invention the final I-F signal generated by the converter 8 is supplied to an analog filter 9, the response of which reproduces the final I-F signal except for suppressing any co-channel NTSC audio signal that accompanies the VSB DTV signal as translated to the low band. The analog filter 9 response is digitized by an analog-to-digital converter 10 before being synchrodyned to baseband in the digital regime. The digitized analog filter 9 response is supplied to a real-samples-to-complex-samples converter 11 that generates imaginary samples from those real samples of digitized analog filter 9 response received as input signal. The real-samples-to-complex-samples converter 11 also delays the real samples of digitized analog filter 9 response to be in correct temporal alignment with the generated imaginary samples of digitized analog filter 9 response, thereby to supply samples of digitized analog filter 9 response in digital complex-number format.

These samples of digitized analog filter 9 response in digital complex-number format are supplied as multiplicand input signal to a complex digital multiplier 12 receiving its multiplier input signal from a source 13 of synchrodyning carrier wave in digital complex-number format. This source 13 of synchrodyning carrier wave typically includes read-only memory (ROM) storing sine and cosine look-up tables descriptive of the synchrodyning carrier wave in digital complex-number format. An address counter addresses the ROM with the count of oscillations supplied by a controlled fourth local oscillator. The real-samples-to-complex-samples converter 11, the complex digital multiplier 12 and the source 13 of synchrodyning carrier wave together provide demodulator circuitry for performing demodulation of the digitized final I-F signal in the digital regime. The imaginary portion of the complex product output signal from the complex digital multiplier 12 is lowpass filtered in processing that generates an automatic frequency and phase control (AFPC) signal for the fourth local oscillator. This AFPC signal minimizes the imaginary low-frequency portion of the complex product output signal and maximizes the real low-frequency portion of the complex product output signal, in a carrier acquisition sub-procedure that is a part of the overall channel equalization procedure.

Channel-equalization filtering 14 receives as input signal either all the samples of the complex product output signal generated by the multiplier 12, or just the samples of the real portion of that complex product output signal. FIG. 1 shows the channel-equalization filtering 14 supplying its output signal to a symbol decoder 16 both directly and via a quantizer or data slicer 15. The data slicer 15 is a digital bin comparator, with the bin numbers corresponding to ideal symbol code levels. So, the response of the data slicer 15 is forced to be one of the ideal symbol code levels. These hard-decision results are supplied to the symbol decoder 16 as possible symbol decoding results. The channel-equalization filtering 14 response as supplied to the data slicer 15 is supplied to the symbol decoder 16 for decoding symbol codes on a soft-decision basis using a Viterbi algorithm. For details concerning symbol decoding the reader is referred to U.S. Pat. No. 5,508,752 entitled "PARTIAL RESPONSE TRELLIS DECODER FOR HIGH DEFINITION TELEVISION (HDTV) SYSTEM" and issued to D. J. Kim, H. S. Kwak and H. J. Nam on Apr. 16, 1996.

The symbol decoder 16 supplies symbol decoding results in 3-parallel-bit groups, assembled by a data assembler 17 for application to trellis decoder circuitry 18. Trellis decoder circuitry 18 conventionally uses twelve trellis decoders. The trellis decoding results are supplied from the trellis decoder circuitry 18 to byte de-interleaver circuitry 19. Byte de-interleaver circuitry 19 parses the trellis decoding results into bytes and performs diagonal byte interleaving over a prescribed portion of the data field to recover bytes of Reed-Solomon error-correction coding for application to Reed-Solomon decoder circuitry 20. Reed-Solomon decoding by the circuitry 20 generates an error-corrected byte stream supplied to a data de-randomizer 21. The data de-randomizer 21 supplies reproduced data to the remainder of the receiver (not shown). The remainder of a complete DTV receiver will include a packet sorter, an audio decoder, an MPEG-2 decoder and so forth. The remainder of a DTV signal receiver incorporated in a digital tape recorder/reproducer will include circuitry for converting the data to a form for recording.

The channel-equalization filtering 14 is presumed to employ the commonplace configuration that includes an infinite-impulse-response (IIR) output filter in cascade after a finite-impulse-response (FIR) input filter. An FIR feedback filter receiving the output signal of the data slicer 15 as input signal via the connection 22 is included within the IIR output filter, together with a digital subtractor differentially combining the input and feedback filter responses to generate input signal for the data slicer 15.

The channel-equalization filtering 14 is adaptive, with at least some of its filter coefficients being subject to change as calculated by computation circuitry 23. After channel equalization is achieved, decision-feedback techniques can be employed to maintain channel equalization despite changes in multipath conditions. A decision- feedback error detector 24 differentially combines signals from the channel-equalization filtering 14, which signals relate to the data slicer 15 input and output signals. The error detector 24 supplies the resulting decision-feedback error signal to the computation circuitry 23 for implementing the decision-feedback techniques that are employed to maintain channel equalization despite changes in multipath conditions. Decision-directed methods are better implemented by including a companion digital filter in the computation circuitry 23. Such a procedure using a least-mean-squares (LMS) optimization procedure implemented on a block-sequential basis is described in U.S. Pat. No. 5,648,987 entitled "RAPID-UPDATE ADAPTIVE CHANNEL-EQUALIZATION FILTERING FOR DIGITAL RADIO RECEIVERS, SUCH AS HDTV RECEIVERS" issued Jul. 15, 1997 to J. Yang, C. B. Patel, T. Liu and A. L. R. Limberg. C. M. Zhao, X. Y. Hu and X. H. Yu indicate in their September 1998 paper "Block Sequential Least Squares Decision Feedback Equalization Algorithm with Application to Terrestrial HDTV Transmission" appearing in IEEE Transactions on Broadcasting, Vol. 44, No. 3, that using block-sequential LMS optimization procedures rather than continuous LMS optimization procedures permits a bit error rate of $3 \times 10^{-9}$ to be achieved with signals having 3.5 dB poorer signal-to-noise ratio.

Initialization of the filter coefficients channel-equalization filtering 14 is preferably done by evaluating a prescribed training signal that is time-division-multiplexed with the digital modulation at the transmitter and received together with multi-path distortion at the receiver. Circuitry 25 extracts the training signal from the data field synchronization (DFS) codes that appear in the initial data segments of data fields. Usually the circuitry 25 is of a type for extracting the middle PN63 sequences from the DFS signals by differentially combining the initial data segments of the data fields within each data frame. Circuitry 26 separates the initial data segments of the data fields for the circuitry 25, responsive to control signals generated in response to symbol count furnished by a symbol counter within the circuitry 26. The symbol count furnished by the symbol counter is periodically reset to prescribed value responsive to particular portions of the DFS codes which portions are selected in most receiver designs so as to include the middle PN63 sequences of the DFS codes.

In order to evaluate the nature of multipath distortion, the computation circuitry 23 compares the prescribed training signal, as received by the receiver with multi-path distortion, with an ideal prescribed training signal free from multi-path distortion as stored at the receiver. The computation circuitry 23 has random-access memory (RAM) included therein for storing segments of the stream of digital samples of the real portion of the equalized baseband symbol coding supplied from the channel-equalization filtering 14, which segments contain the received training signal or ghosts thereof.

Especially if the differential delays between the principal received signal and its ghosts are not too long, discrete Fourier transform (DFT) methods can be used to initialize the kernel weights for the digital filtering in a very short time. The DFT of the prescribed training signal with multi-path distortion as received by the receiver is calculated and divided by the DFT of the prescribed training signal to determine the DFT of the transmission channel, a process referred to as "characterizing the channel". The complement of the channel DFT describes the DFT the adaptive channel-equalization filtering 14 should have, and the kernel weights are determined accordingly. These calculations are carried out by a micro-processor with suitable software being included in the computation circuitry 23. The computation circuitry 23 can include read-only memory (ROM) for storing the DFT of the prescribed training signal. This saves having to calculate the DFT of the prescribed training signal from the prescribed training signal per se as stored and read from ROM.

If the differential delay between the principal received signal and a ghost thereof is substantial, several microseconds or tens of microseconds, a match filter for the training signal can be included in the computation circuitry 23 and used in conjunction with a microprocessor also included in the computation circuitry 23 for determining the differential delay and the relative magnitude of the ghost. This can speed up the calculation of kernel weights for filters which use programmable bulk delay between sparse groupings of taps that have non-zero weights.

Figure 2:
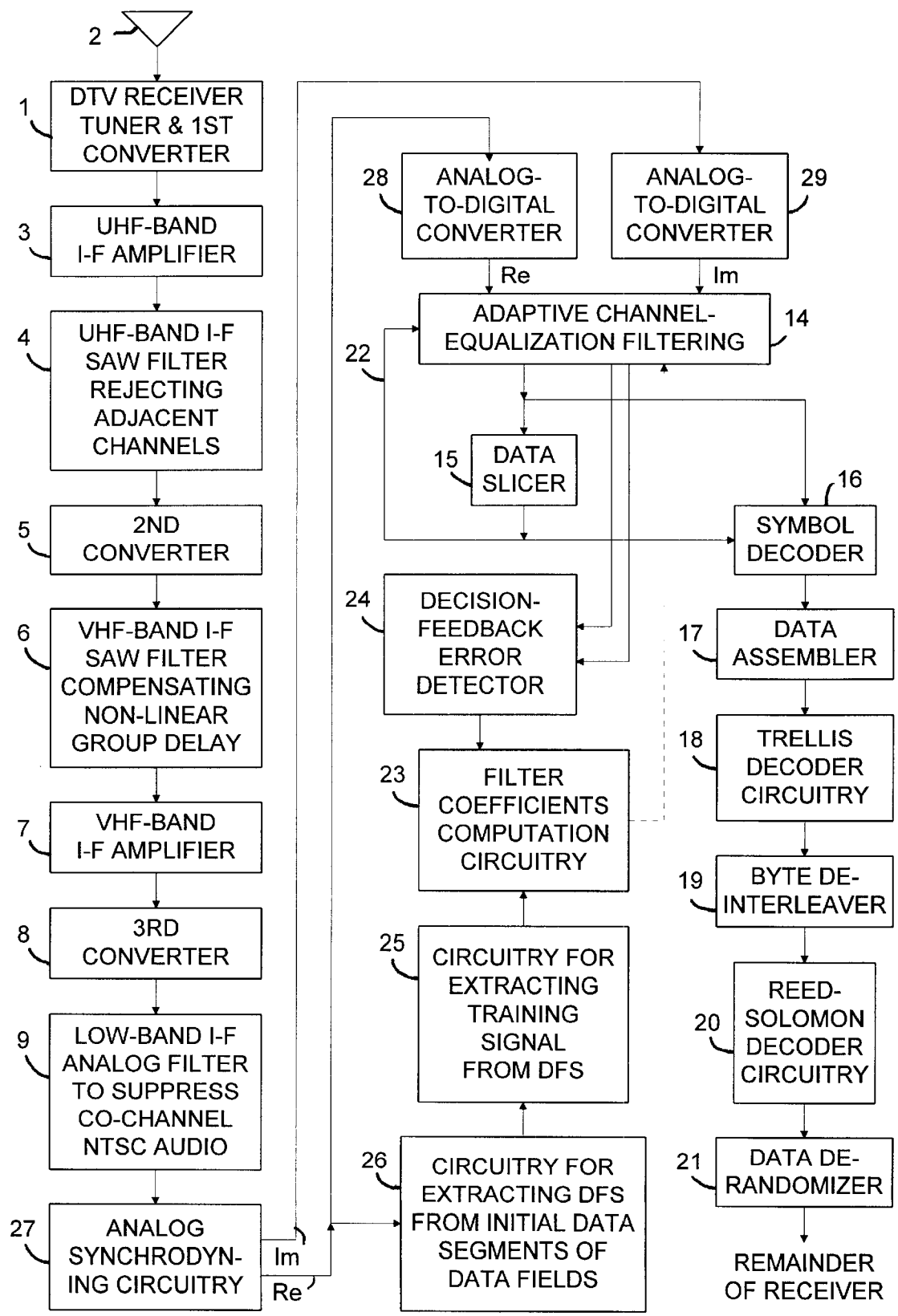
FIG. 2 is a schematic diagram of a DTV signal receiver that in accordance with the invention filters low-band final-intermediate-frequency signal to suppress co-channel interfering NTSC audio signal therefrom and that synchrodynes the filtered final I-F signal to baseband in the analog regime.

FIG. 2 shows a DTV signal receiver that synchrodynes low-band final-intermediate-frequency signals to baseband in the analog regime. The FIG. 2 DTV signal receiver differs from the FIG. 1 DTV signal receiver in that the elements 10–13 associated with synchrodyning to baseband in the digital regime are discarded. The discarded elements are replaced by demodulator circuitry 27 for synchrodyning to baseband in the analog regime and by analog-to-digital converters 28 and 29 for digitizing the real and imaginary results of such synchrodyning for application to the channel-equalization filtering 14. If the channel-equalization filtering 14 does not utilize the imaginary results of synchrodyning, the analog-to-digital converter 29 can be dispensed with, of course. The demodulator circuitry 27 for synchrodyning to baseband in the analog regime customarily includes in-phase and quadrature-phase synchronous detectors respectively supplied in-phase and quadrature-phase oscillations from a fourth local oscillator as respective reference carrier waves. The output signal from the quadrature-phase synchronous detector is lowpass filtered to develop automatic frequency and phase control signal for the fourth local oscillator.

In the DTV signal receivers of FIGS. 1 and 2 the design of the second converter 5 may follow the example of the Grand Alliance DTV receivers in which the second local oscillations are at a frequency below the UHF I-F band. Alternatively, the second local oscillations can be at a frequency above the UHF I-F band, which is preferable in that the second oscillations do not fall within a UHF TV channel. The tuner and first converter circuitry 1 is presumed to generate the UHF I-F band as the difference of the frequency spectrum of the TV signal selected for reception subtracted from the frequency of the first local oscillations, resulting in the DTV signal as translated to the UHF I-F band exhibiting a reversed frequency spectrum respective to that of the DTV signal as broadcast. Therefore using second local oscillations above the UHF I-F band results in the DTV signal exhibiting a frequency spectrum that is not reversed from the transmitted spectrum, while using second local oscillations below the UHF I-F band results in the DTV signal exhibiting a frequency spectrum that is reversed from the transmitted spectrum. The choice of frequencies for the second local oscillations and the third local oscillations is an important consideration when deciding how the DTV signals are to repose in the final I-F band.

If the carrier of the VSB DTV signal as translated to the final I-F band is to be lower in frequency than the midband frequency of the final I-F band, the third local oscillations must be closer in frequency to the VSB carrier as translated to the VHF I-F band than the midband frequency of the VHF I-F band. If the UHF I-F band is at 917–923 MHz and 876 MHz second local oscillations are used, the VSB carrier is translated to just below 47 MHz in a 41 to 47 MHz VHF I-F band. Because of spectrum reversal owing to the second local oscillations being below the UHF I-F band, the requirements on offsetting the VSB carrier from zero frequency in the final I-F band place the third local oscillations above 48 MHz, placing their second harmonic in the FM broadcast band. This presents some risk of interference with weak reception in a broadcast FM receiver located near the DTV receiver, owing to capture of the limiter in the FM receiver. One may prefer to locate the VHF I-F band at a somewhat lower frequency, so the third local oscillations are below 44 MHz. (In a single-conversion television receiver the intermediate frequencies are made as high as possible, while remaining below the very-high-frequency television broadcast band and avoiding the second harmonic of NTSC sound carrier falling into the FM broadcast band, in order to prevent image frequencies from the single conversion falling too close by the desired signal to be selected against by tuned radio-frequency amplification. There is no such constraint in a plural-conversion tuner.) Locating the VHF I-F band at a lower frequency makes it more difficult to provide selectivity with the SAW filter 6, however, which is further reason for the SAW filter 4 in the UHF I-F band defining the overall selection characteristic of the receiver. The frequency of second oscillations can be increased to fall just above the 890 MHz upper limit frequency of channel 83, and the UHF I-F band adjusted upward to locate the VHF I-F band an appropriate amount below the frequency of third local oscillations reduced to below 44 MHz. For example, if the frequency of third local oscillations is chosen to be at 43.4 MHz and if the VSB carrier as translated to final I-F band is at 2.69 MHz, so the final I-F band is 2.4 to 8.4 MHz, the VHF I-F band is at 35 to 41 MHz. If the frequency of second local oscillations chosen to be at 890.5 MHz, the UHF I-F band must be at 925.5 to 931.5 MHz.

If the carrier of the VSB DTV signal as translated to the final I-F band is to be lower in frequency than the midband frequency of the final I-F band, but there is no spectrum reversal in the VHF I-F band because of the second local oscillations being at a frequency above the UHF I-F band, the third local oscillations will be at a frequency below the VHF I-F band. The third harmonic of these third local oscillations preferably should be above the 88 to 108 MHz FM broadcast band, so the third local oscillations preferably are of a frequency somewhat above 36 MHz. The NTSC sound carrier is located near the top of the VHF I-F band; and the second harmonic of this FM carrier should fall below the FM broadcast band, so this carrier should not be above 43.75 MHz. If the VSB carrier as translated to final I-F band is at 2.69 MHz, so the final I-F band is 2.4 to 8.4 MHz, and the third local oscillations are at 36.6 MHz, the VHF I-F band is at 39 to 45 MHz, placing the NTSC sound carrier at a frequency that can cause interference with a broadcast FM receiver. The NTSC sound carrier is too high in frequency even if the third local oscillations are at 36.0 MHz.

If the third local oscillations are at 36.0 MHz and if the VSB carrier as translated to final I-F band is at 1.35 MHz, so the final I-F band is 1 to 7 MHz, the VHF I-F band is at 37 to 44 MHz. The NTSC sound carrier is just barely low enough in frequency. If the carrier of the VSB DTV signal as translated to the final I-F band is to be lower in frequency than the midband frequency of the final I-F band, then, it is better to use second local oscillations of a frequency below the UHF I-F band in frequency so there is a reversal of DTV signal frequency spectrum in the VHF I-F band.

If the carrier of the VSB DTV signal is to be higher in frequency than the midband frequency in the final I-F band, the third local oscillations should be closer in frequency to the midband frequency of the VHF I-F band than the VSB carrier as translated to VHF I-F band. If the VSB carrier is just above the lower limit frequency of the VHF I-F band, owing to the first local oscillations being above the UHF I-F band, in order for the carrier of the VSB DTV signal to be above the midband frequency in the final I-F band, the third local oscillations should be above the VHF I-F band. It is preferable that the third oscillations are lower in frequency than 44 MHz, to prevent their second harmonic falling in the FM broadcast band. Also, the NTSC sound carrier is at the top of the VHF I-F band, and it is desirable to prevent its second harmonic falling in the FM broadcast band. If there is no spectrum reversal owing to the second local oscillations being above the UHF I-F band and if further the third local oscillations should be above the VHF I-F band to place the carrier of the VSB DTV signal above the midband frequency in the final I-F band, the VHF I-F band is preferably located lower in frequency than 41 to 47 MHz. If the VHF I-F band is located lower than 36 to 42 MHz, third harmonics of signals in this band overlap the top portion of the FM broadcast band. Within these constraints, the VSB carrier in the final I-F band should not be higher than 7.69 MHz. This requirement can be met by a VSB carrier that is the third subharmonic of 21.52 MHz, the second harmonic of the $10.76 \cdot 10^6$ symbol per second symbol rate for VSB DTV.

If the VSB carrier is just below the upper limit frequency of the VHF I-F band owing to the second local oscillations being below the UHF I-F band, in order for the carrier of the VSB DTV signal to be above the midband frequency in the final I-F band, the third local oscillations should be below the VHF I-F band. If the VSB carrier is just below 47 MHz in a 41 to 47 MHz VHF I-F band, third local oscillations below the VHF I-F band, but above 36 MHz, have their harmonics outside the FM broadcast band. Within these constraints, the VSB carrier in the final I-F band can be as high as 10.69 MHz. Locating the UHF I-F band slightly higher in frequency allows a VSB carrier of 10.76 MHz. A 41 to 47 MHz VHF I-F band is possible without the second local oscillations falling in the UHF TV broadcast band. If the frequency of second local oscillations chosen to be at 890.5 MHz, the UHF I-F band should be at 931.5 to 937.5 MHz.

A final I-F signal with a 10.76 MHz (i. e., one-half symbol rate) carrier frequency near the upper-frequency end of the signal band is attractive in a DTV receiver that digitizes that final I-F signal at twice symbol rate to facilitate fractional equalization in the channel-equalization filter. A final I-F signal with a 7.17 MHz (i. e., two-thirds symbol rate) carrier frequency near the upper-frequency end of the signal band is attractive in a DTV receiver that digitizes that final I-F signal at 14.34 MHz (i. e., four-thirds symbol rate) to facilitate fractional equalization in the channel-equalization filter. The vestigial upper sideband precisely aliases into the full lower sideband in the result of synchrodyning to baseband in each of the foregoing cases.

A final I-F signal with a 2.69 MHz carrier frequency near the lower-frequency end of the signal band and with a highest desired frequency near 8.07 MHz will at times be accompanied by undesired 8.13 MHz audio carrier of co-channel NTSC interfering signal and the FM sidebands of that carrier. This FM audio carrier can have appreciable energy in a ±70 kHz band extending from 8.06 to 8.20 MHz. So deep cut-off of frequency response must be achieved over a frequency change of 60 kHz, starting from a frequency about 8.07 MHz. The cut-off slope exists over substantially the same absolute frequency change, 60 kHz, no matter the frequency band in which NTSC rejection filtering is done. However, in relative frequency terms the 60 kHz cut-off slope region is about 0.74% of a 8.13 MHz NTSC audio carrier frequency in the low-band final I-F signal, rather than about 0.145% of a 41.25 MHz NTSC audio carrier frequency in the VHF I-F band, or about 0.006% of a 922.75 MHz NTSC audio carrier frequency in the UHF I-F band. This greatly eases the cut-off requirements on the filter to suppress the audio carrier of co-channel NTSC interfering signal and its FM sidebands. The cut-off requirements are eased even a little more in a final I-F signal with a carrier near the higher-frequency end of the signal band and with a NTSC audio carrier frequency in the low-band final I-F signal of only one to two megahertz.

Figure 3:
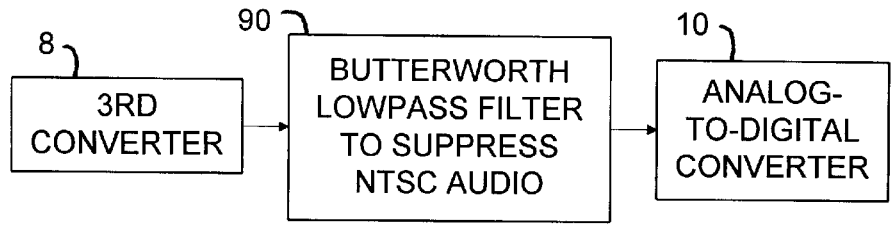
FIGS. 3–12, 23 and 24 are schematic diagrams showing in greater detail the filters used to suppress co-channel interfering NTSC audio signal in the low-band final-intermediate-frequency signal of various species of the FIG. 1 DTV signal receiver.

FIG. 3 shows the filter 9 of FIG. 1 being realized as a lowpass RLC filter 90 of Butterworth type for suppressing the co-channel NTSC audio carrier in designs where its frequency is above that of the DTV carrier in the final I-F band. The Butterworth lowpass filter exhibits non-linear delay, with increasing non-uniformity in group delay as cut-off is approached. This non-uniformity in group delay is compensated in substantial degree in the SAW filter 6.

Figure 4:
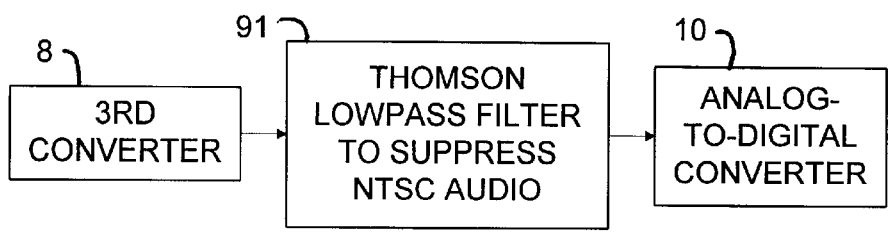

FIG. 4 shows the filter 9 of FIG. 1 being realized as a lowpass RLC filter 91 of Thomson type for suppressing the co-channel NTSC audio carrier in designs where its frequency is above that of the DTV carrier in the final I-F band. A Thomson lowpass filter has substantially more uniform group delay than a Butterworth lowpass filter, but more LC sections are required to obtain as sharp a cut-off. The more uniform group delay of the Thomson lowpass filter reduces the amount of non-linear phase compensation the SAW filter 6 has to provide for the filter 9 of FIG. 1.

Figure 5:
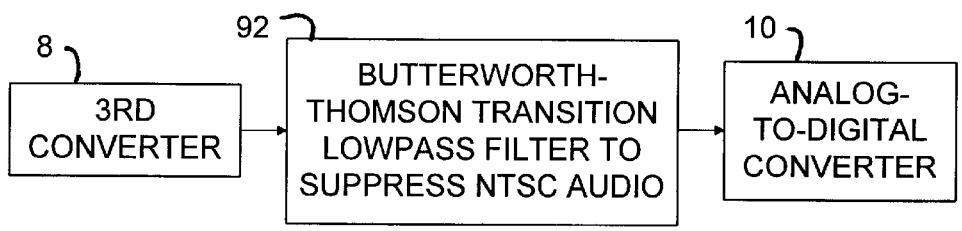

FIG. 5 shows the filter 9 of FIG. 1 being realized as a lowpass RLC filter 92 of Butterworth-Thomson-transition type for suppressing the co-channel NTSC audio carrier in designs where its frequency is above that of the DTV carrier in the final I-F band. The Butterworth-Thomson-transition lowpass filter 92 is preferred for its good transient response, which helps to make data slicing more accurate.

The Butterworth lowpass filter 90 of FIG. 3 (or 13), the Thomson lowpass filter 91 of FIG. 4 (or 14) or the Butterworth-Thomson-transition lowpass filter 92 of FIG. 5 (or 15) renders superfluous the inclusion of further lowpass filtering in the ADC 10 for suppressing the aliasing of above-band noise into band during analog-to-digital conversion. When a highpass filter or a band-rejection filter is used for suppressing the audio carrier of co-channel NTSC interfering signal and its FM sidebands, the ADC 10 is better designed to include lowpass filtering for suppressing such aliasing.

Figure 6:
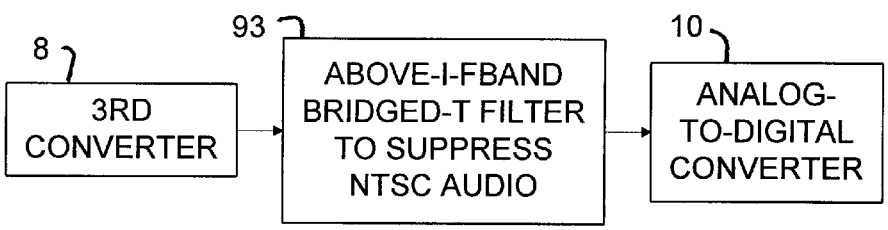

FIG. 6 shows the filter 9 of FIG. 1 being realized as a bridged-T trap filter 93 for suppressing the co-channel NTSC audio carrier in designs where its frequency is above that of the DTV carrier in the final I-F band. The bridged-T type band-rejection filter can provide very good null rejection of the co-channel NTSC audio carrier, about 60 dB, no matter what the rejection frequency is chosen to be.

A final I-F signal with a 2.69 MHz carrier near the lower-frequency end of the signal band and with a highest desired frequency near 8.07 MHz will at times be accompanied by undesired 8.13 MHz audio carrier of co-channel NTSC interfering signal and the FM sidebands of that carrier. In relative frequency terms the 60 kHz frequency difference between the NTSC audio carrier frequency and one-half DTV symbol frequency is about 0.73% of its 8.13 MHz mid-frequency. A bridged-T trap filter 93 with a Q of 500 will exhibit a roll-off of 20 dB or so at the 8.07 MHz shoulder frequency.

A final I-F signal with a 1.345 MHz carrier near the lower-frequency end of the signal band and with a highest desired frequency near 6.725 MHz will at times be accompanied by undesired 6.785 MHz audio carrier of co-channel NTSC interfering signal and the FM sidebands of that carrier. In relative frequency terms the 60 kHz frequency difference between the NTSC audio carrier frequency and one-half DTV symbol frequency is about 0.88% of its 6.785 MHz mid-frequency. A bridged-T trap filter 93 with a Q of 500 will exhibit a roll-off of 18 dB or so at the 6.725 MHz shoulder frequency.

The large roll-off in amplitude response at the shoulder frequencies of the DTV signal presents a design problem when the DTV carrier frequency is located too close to zero frequency in the final I-F band and the bridged-T trap filter 93 rejection frequency must be 5.38 megahertz or more. The design of a bridged-T trap filter with a lower rejection frequency requires that the DTV carrier frequency be located above 5.38 MHz with the full AM sideband and the NTSC audio carrier being below the DTV carrier in frequency.

The bridged-T trap filter 93 is cascaded with a lowpass RLC filter 90 of Butterworth type, with a lowpass RLC filter 91 of Thomson type, or with a lowpass RLC filter 92 of Butterworth-Thomson transition type in other embodiments of the invention.

Figure 7:
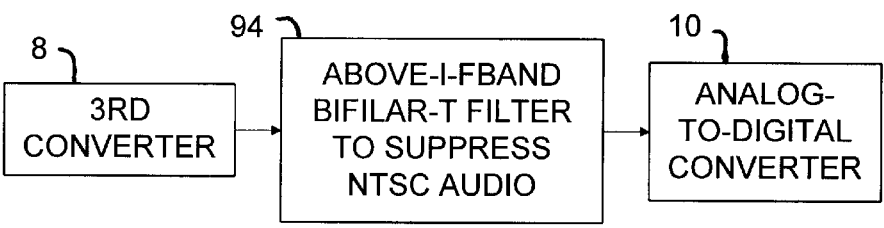

FIG. 7 shows the filter 9 of FIG. 1 being realized as a bifilar-T trap filter 94 for suppressing the co-channel NTSC audio carrier in designs where its frequency is above that of the DTV carrier in the final I-F band. In an NTSC analog television receiver the commonly used bifilar-T trap has its null response at 41.25 MHz, and the influence of the trap extends Up to about 41.65 MHz. Another bifilar-T trap is used at 47.25 MHz to reject adjacent-channel sound carrier in some NTSC analog TV receivers. In a DTV receiver using a VHF I-F band that extends from 41 to 47 MHz, the trap response should roll off only 3 dB at 41.31 MHz, so the slope region of the trap should be about six times as steep as in the NTSC analog television receiver. It is impractical to achieve this design goal using a bifilar-T trap in a VHF I-F band that extends from 41 to 47 MHz. If the bifilar-T trap is employed in a low I-F band that extends from 2.69 to 8.07 MHz, however, the goal is probably achievable because of the five-fold reduction in frequency scale. If the bifilar-T trap is employed in a low I-F band that extends from 1.35 to 6.73 MHz, there is an almost seven-fold reduction in frequency scale that assures that the slope region can be made steep enough to fit within the 60 kilocycle range. When co-channel interfering NTSC audio carrier is at the upper end of the low-band I-F spectrum, the bifilar-T trap is preferred over the bridged-T trap because the steep cut-off slope that can is required is more easily achieved with the bifilar-T trap.

The bifilar-T trap filter 94 is cascaded with a lowpass RLC filter 90 of Butterworth type, with a lowpass RLC filter 91 of Thomson type, or with a lowpass RLC filter 92 of Butterworth-Thomson transition type in other embodiments of the invention.

Figure 8:
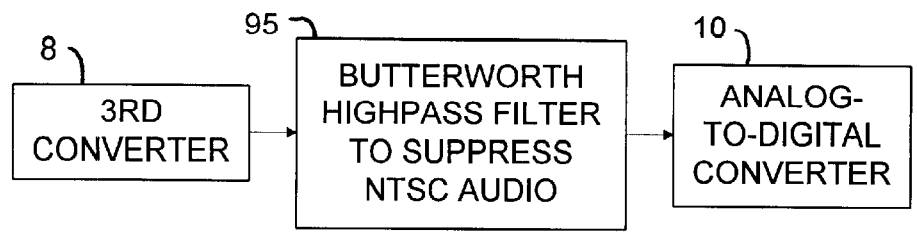

FIG. 8 shows the filter 9 of FIG. 1 being realized as a highpass RLC filter 95 of Butterworth type for suppressing the co-channel NTSC audio carrier in designs where its frequency is below that of the DTV carrier in the final I-F band. The Butterworth lowpass filter exhibits non-linear delay, with increasing non-uniformity in group delay as cut-off is approached. This non-uniformity in group delay is compensated in substantial degree in the SAW filter 6.

Figure 9:
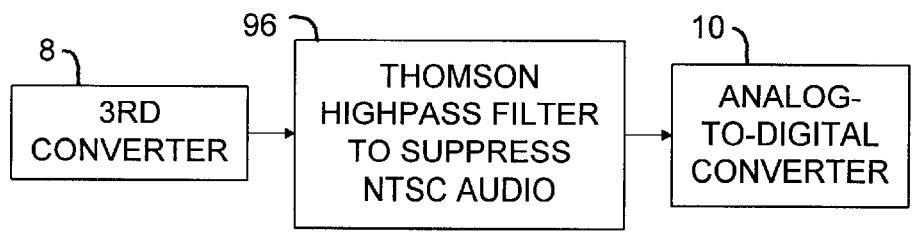

FIG. 9 shows the filter 9 of FIG. 1 being realized as a highpass RLC filter 96 of Thomson type for suppressing the co-channel NTSC audio carrier in designs where its frequency is below that of the DTV carrier in the final I-F band. A Thomson lowpass filter has substantially more uniform group delay than a Butterworth lowpass filter, but more LC sections are required to obtain as sharp a cut-off. The more uniform group delay of the Thomson lowpass filter reduces the amount of non-linear phase compensation the SAW filter 6 has to provide for the filter 9 of FIG. 1.

Figure 10:
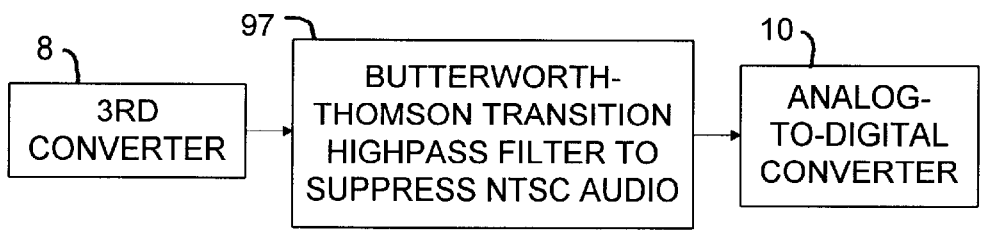

FIG. 10 shows the filter 9 of FIG. 1 being realized as a highpass RLC filter 97 of Butterworth-Thomson transition type for suppressing the co-channel NTSC audio carrier in designs where its frequency is below that of the DTV carrier in the final I-F band.

Figure 11:
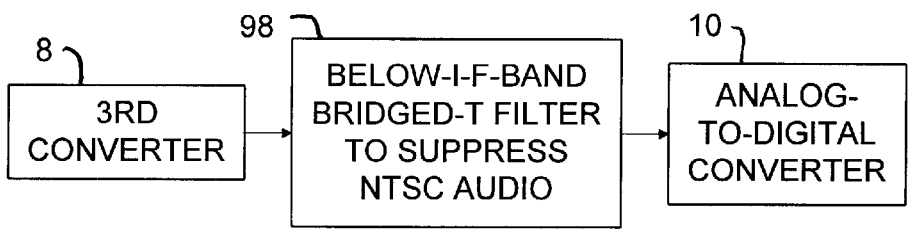

FIG. 11 shows the filter 9 of FIG. 1 being realized as a bridged-T trap filter 98 for suppressing the co-channel NTSC audio carrier in designs where its frequency is below that of the DTV carrier in the final I-F band.

A final I-F signal with a 10.76 MHz carrier near the upper-frequency end of the final I-F band and with a lowest desired frequency near 5.38 MHz will at times be accompanied by undesired 5.32 MHz audio carrier of co-channel NTSC interfering signal and the FM sidebands of that carrier. In relative frequency terms the 60 kHz frequency range over which filter cut-off must occur is about 1.15% of its 5.2 MHz mid-frequency. A single-section bridged-T trap with a Q of 500 provides 60 dB rejection at trap frequency, with a shoulder about 9 dB down in amplitude response at a frequency 1.15% away from the trap frequency.

A final I-F signal with a 7.17 Hz carrier near the upper-frequency end of the final I-F band and with a lowest desired frequency near 1.79 MHz will at times be accompanied by undesired 1.73 MHz audio carrier of co-channel NTSC interfering signal and the FM sidebands of that carrier. In relative frequency terms the 60 kHz frequency range over which filter cut-off must occur is about 3.47% of its 1.73 MHz mid-frequency. A single-section bridged-T trap with a Q of 500 provides 60 dB rejection at trap frequency, with a shoulder about 6 dB down in amplitude response at a frequency 3.47% away from the trap frequency.

A final I-F signal with a 7.17 Hz (2/3 symbol rate) carrier near the upper-frequency end of the final I-F signal band and with a lowest desired frequency near 1.79 MHz will at times be accompanied by undesired 1.73 MHz audio carrier of co-channel NTSC interfering signal and the FM sidebands of that carrier. In relative frequency terms the 60 kHz frequency range over which filter cut-off must occur is about 3.47% of its 1.73 MHz mid-frequency. A single-section bridged-T trap with a Q of 500 provides 60 dB rejection at trap frequency, with a shoulder about 6 dB down in amplitude response at a frequency 3.47% away from the trap frequency.

A final I-F signal with a 6.46 Hz (3/5 symbol rate) carrier near the upper-frequency end of the final I-F signal band and with a lowest desired frequency near 1.08 MHz will at times be accompanied by undesired 1.02 MHz audio carrier of co-channel NTSC interfering signal and the FM sidebands of that carrier. In relative frequency terms the 60 kHz frequency range over which filter cut-off must occur is about 5.90% of its 1.02 MHz mid-frequency. A single-section bridged-T trap with a Q of 500 provides 60 dB rejection at trap frequency, with a shoulder about 4 dB down in amplitude response at a frequency 5.90%, away from the trap frequency.

Using a final I-F signal with a carrier near the upper-frequency end of the signal band, but with the co-channel NTSC audio carrier closer to zero frequency, makes plural-section bridged-T trap filters with individual sections at slightly different tuning feasible. The physical size of inductors in the bridged-T trap filters will tend to be increased somewhat with the lowering of the trap frequency to only one or two MHz.

The bridged-T trap filter 98 is cascaded with a highpass RLC filter 95 of Butterworth type, with a highpass RLC filter 96 of Thomson type, or with a highpass RLC filter 97 of Butterworth-Thomson transition type in other embodiments of the invention.

Figure 12:
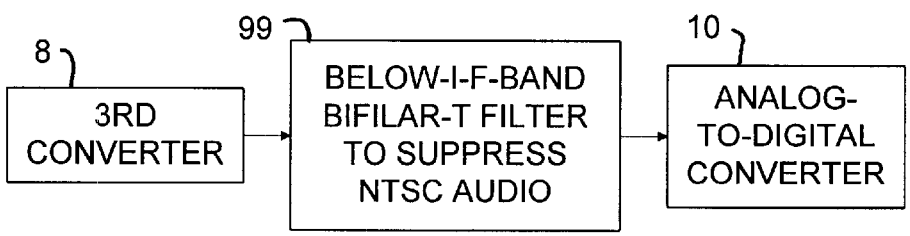
Figure 13:
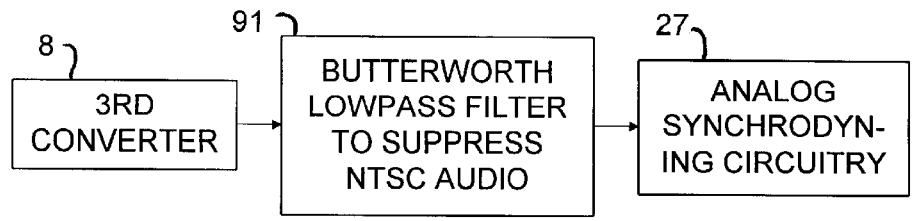
FIGS. 13–22, 25 and 26 are schematic diagrams showing in greater detail the filters used to suppress co-channel interfering NTSC audio signal in the low-band final-intermediate-frequency signal of various species of the FIG. 2 DTV signal receiver.
Figure 14:
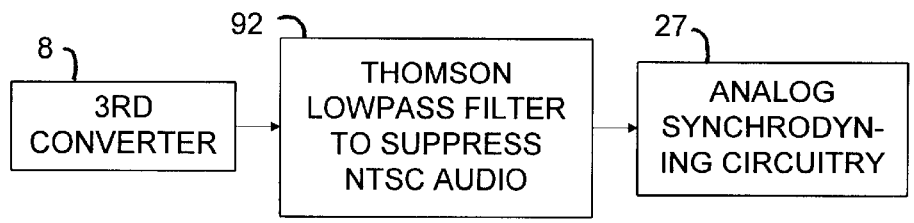
Figure 15:
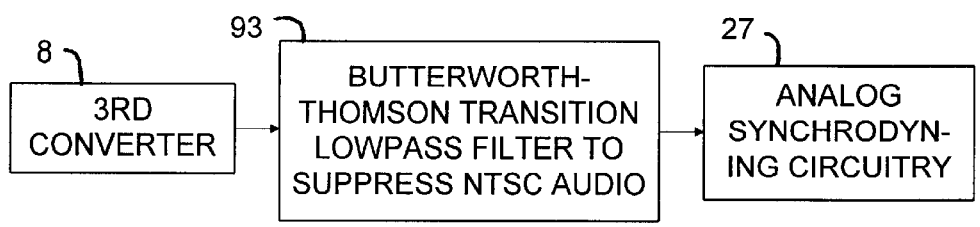
Figure 16:
Figure 17:
Figure 18:
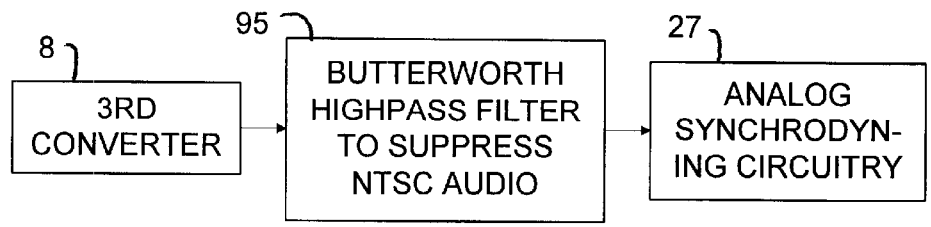
Figure 19:
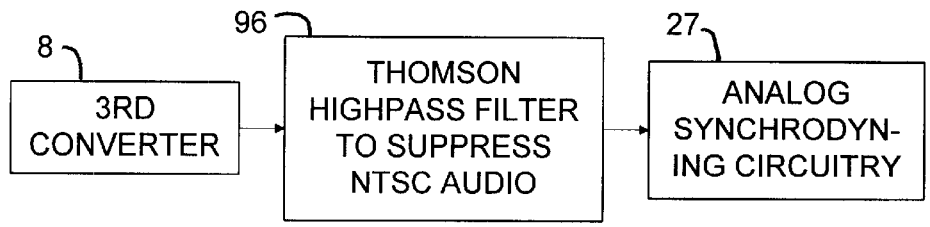
Figure 20:
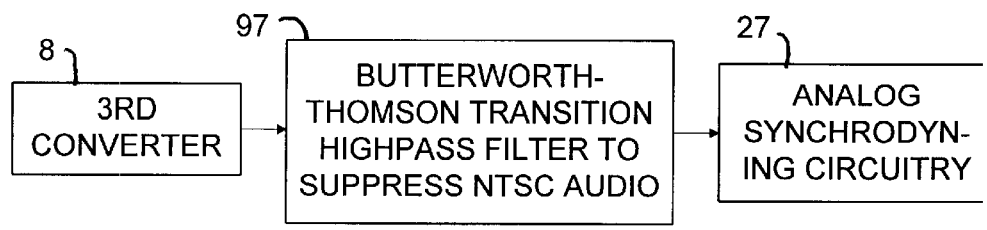
Figure 21:
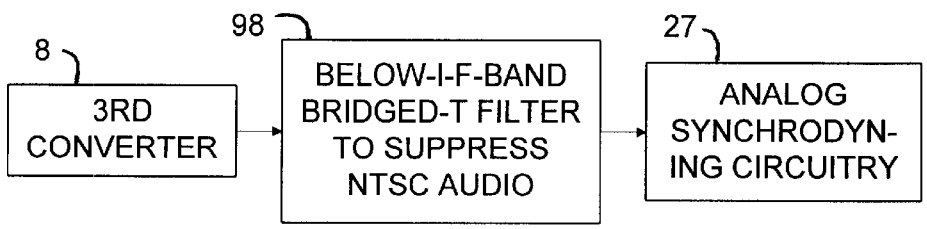
Figure 22:
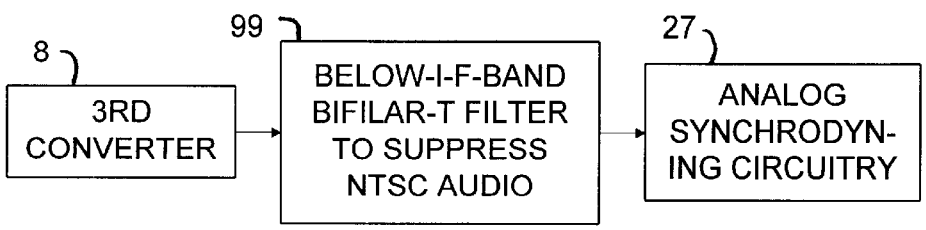

FIG. 12 shows the filter 9 of FIG. 1 being realized as a bifilar-T trap filter 99 for suppressing the co-channel NTSC audio carrier in designs where its frequency is below that of the DTV carrier in the final I-F band. The lower trapping frequency makes it easier to meet co-channel NTSC audio carrier trap requirements without introducing unwanted attenuation of DTV signal. The bifilar-T trap filter 99 is cascaded with a highpass RLC filter 95 of Butterworth type, with a highpass RLC filter 96 of Thomson type, or with a highpass RLC filter 97 of Butterworth-Thomson transition type in other embodiments of the invention. Still other embodiments of the invention use a bifilar-T trap for adjacent-channel NTSC audio carrier as well as a bifilar-T trap for co-channel interfering NTSC audio carrier.

FIGS. 13–22 show the filter 9 of the FIG. 2 DTV signal receiver being realized similarly to the ways that the filter 9 of the FIG. 1 DTV signal receiver is realized in FIGS. 3–12, respectively.

As pointed out above, the design of the SAW filters 4 and 6 is such as to compensate for the delay distortion in the filter 9 when that filter is an analog RLC filter. This compensation is preferably provided within the context of optimizing the response of the DTV receiver from the tuner and first converter 1 up to the adaptive channel equalization filtering 14 insofar as possible.

Figure 23:
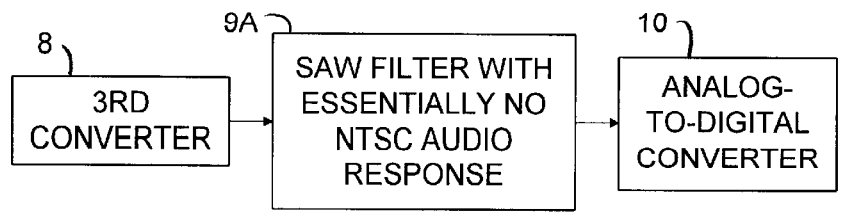

FIG. 23 shows the filter 9 of FIG. 1 being realized as a surface acoustic wave (SAW) filter 9A for supplying a bandpass response to the low-band I-F signal from the third converter 8, which SAW filter 9A has essentially no response to any accompanying co-channel NTSC audio carrier. FIG. 23 shows the SAW filter 9A connected for supplying its bandpass response to the analog-to-digital converter 10 for digitization. SAW filters in the high-frequency range are usually constructed on lithium niobate substrates.

Figure 24:
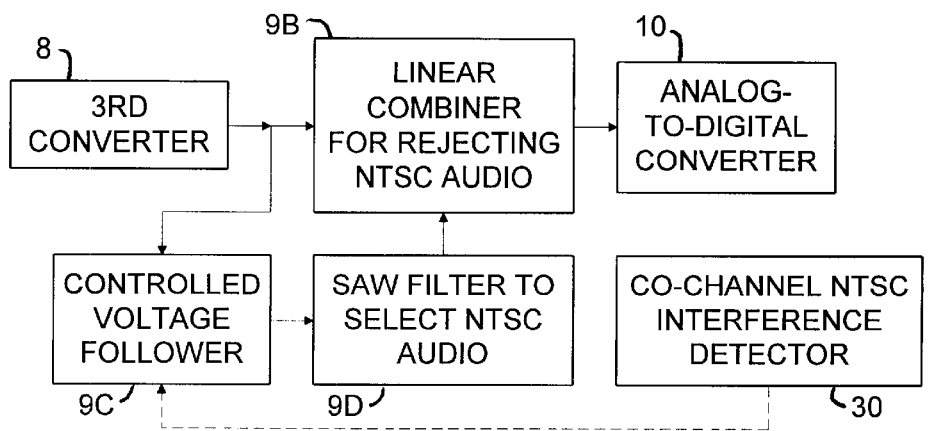

FIG. 24 shows the filter 9 of FIG. 1 comprising a SAW filter 9B, a controlled voltage follower 9C, and a linear combiner 9D. The frequency selectivity of the SAW filter 9B is such that the SAW filter 9B responds to any co-channel NTSC audio carrier accompanying the low-band I-F signal from the third converter 8 and sidebands of such audio carrier that do not overlap DTV signal significantly. The controlled voltage follower 9C provides a voltage response that either follows the SAW filter 9B response or is at fixed potential, depending on whether or not a co-channel NTSC interference detector 30 indicates co-channel NTSC interference is occurring. A controlled voltage follower can be constructed using transmission gates operated as a single-pole-double-throw electronic switch for selecting the SAW filter 9B response or fixed potential to the input of an operational amplifier in voltage-follower connection, for example. The voltage response from the controlled voltage follower 9C combines with the low-band I-F signal from the third converter 8 in the linear combiner 9D to generate low-band I-F signal without accompanying co-channel NTSC audio carrier for application to the analog-to-digital converter 10. The linear combiner 9D includes an amplifier compensating for the insertion loss in the SAW filter 9B. The linear combiner 9D includes either an analog adder or an analog subtractor for combining the amplified SAW filter 9B with the low-band I-F signal from the third converter 8, depending on the delay in the SAW filter 9B. An exemplary structure for the controlled voltage follower 9C uses an operational amplifier connected as a voltage-follower for reproducing either the SAW filter 9B response or a fixed potential, as selected by a pair of transmission gates operated as an electrically controlled single-pole, double-throw switch.

Various forms for the co-channel NTSC interference detector 30 are known, one of the better ones detecting the presence of 4.5 MHz intercarrier beat between the video and audio carriers of co-channel interfering NTSC signal in the response of an envelope detector for the VHF I-F signal. This form of co-channel NTSC interference detector is described in U.S. Pat. No. 5,923,378 issued Jul. 13, 1999 to A. L. R. Limberg and titled "USING INTERCARRIER SIGNALS FOR DETECTING NTSC INTERFERENCE IN DIGITAL TV RECEIVERS".

The SAW filter 9B is easier to realize than the SAW filter 9A, since the bandwidth of the SAW filter 9B is only ±60 kilohertz or so, rather than the 5.38 MHz or so bandwidth of the SAW filter 9A. In variants of the FIG. 24 circuitry the bandwidth of the SAW filter 9B is asymmetrical around NTSC audio carrier frequency, better to reject the NTSC audio carrier sideband more remote in frequency from the DTV signal frequencies. In other variants of the FIG. 24 circuitry the SAW filter 9B selects frequency components near the co-channel NTSC video carrier for cancellation by the linear combiner 9D, in addition to frequency components near the co-channel NTSC audio carrier.

In still other variants of the FIG. 24 circuitry the controlled voltage follower 9C is dispensed with, and the SAW filter 9B response is applied directly to the linear combiner 9D. Selectively applying the SAW filter 9B response to the linear combiner 9D is advantageous in that filtering of the DTV signal to minimize intersymbol interference is not interfered with in any way when co-channel NTSC interference does not obtain in any significant degree.

Figure 25:

FIG. 25 shows the filter 9 of FIG. 2 being realized as a surface acoustic wave (SAW) filter 9A for supplying bandpass response to the low-band I-F signal from the third converter 8, which SAW filter 9A has essentially no response to any accompanying co-channel NTSC audio carrier. FIG. 25 shows the SAW filter 9A connected for supplying its bandpass response to the circuitry 27 for synchrodyning to baseband in the analog regime.

Figure 26:
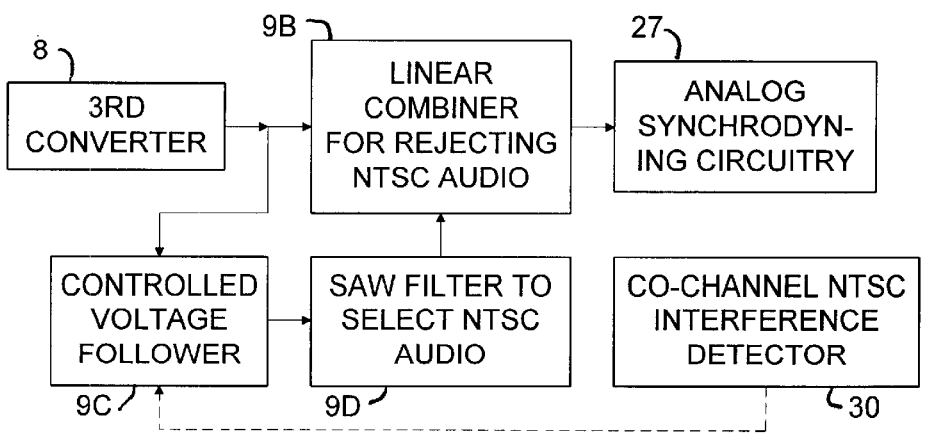

FIG. 26 shows the filter 9 of FIG. 2 comprising the SAW filter 9B, the controlled voltage follower 9C, and the linear combiner 9D. The linear combiner 9D is connected for supplying low-band I-F signal without accompanying co-channel NTSC audio carrier to the circuitry 27 for synchrodyning to baseband in the analog regime.

Figure 27:
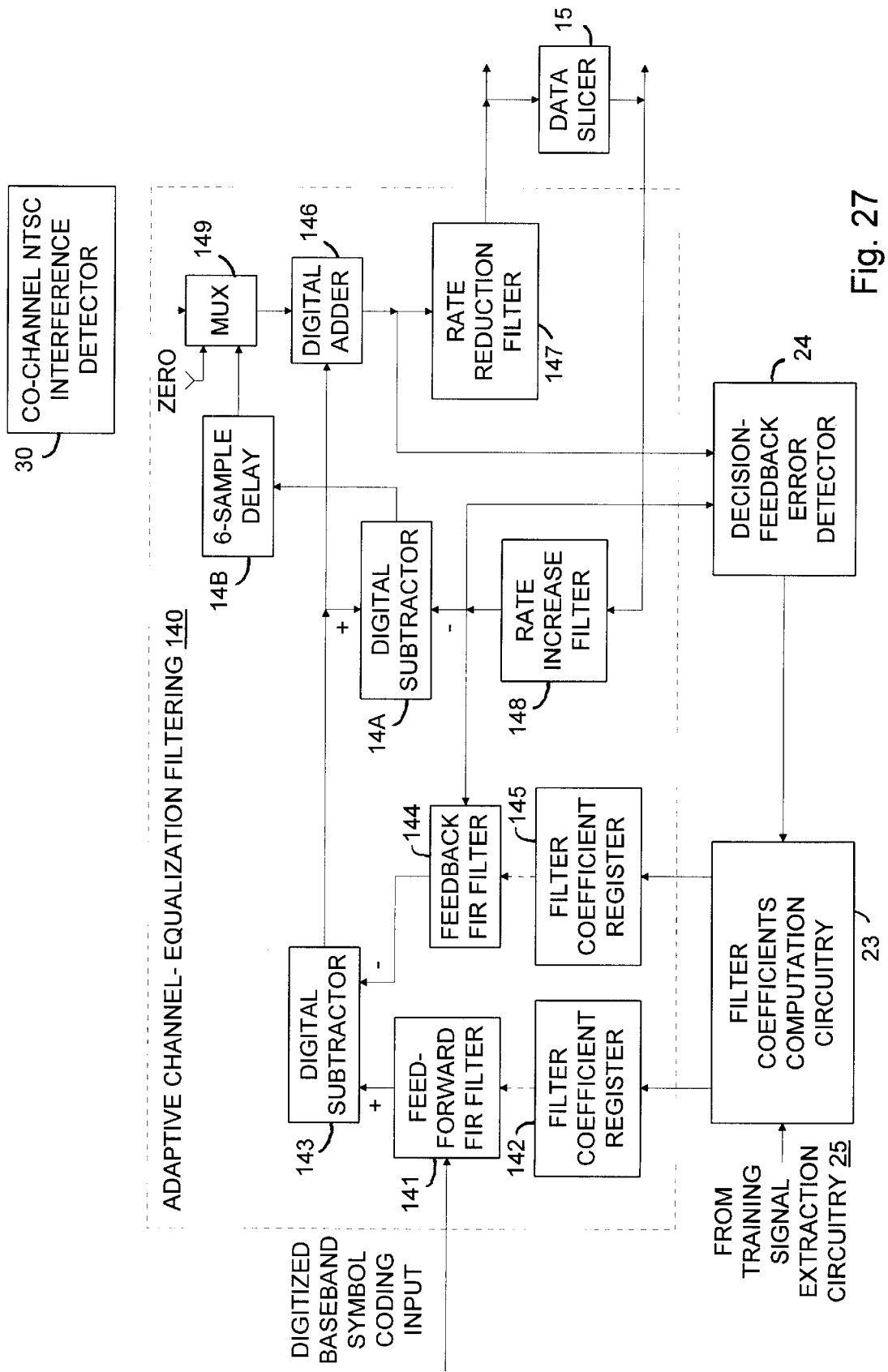
FIG. 27 is a schematic diagram showing details of adaptive channel-equalization filtering suitable for use with a DTV signal receiver embodying the invention.

FIG. 27 shows one form that the adaptive channel-equalization filtering 14 can take. This form of channel-equalization filtering 14 operates on the digitized baseband symbol coding as a fractional equalizer. This form of channel-equalization filtering 14 also provides for the suppression of the video carrier and the chroma subcarrier of a co-channel interfering NTSC analog TV signal. The FIG. 27 channel-equalization filtering 14 comprises a finite-impulse-response (FIR) digital filter 141 having filtering coefficients stored in a temporary storage register 142, a digital subtractor 143, an FIR digital filter 144 having filtering coefficients stored in a temporary storage register 145, a digital adder 146, a sample-rate-reduction filter 147, a sample-rate-increase filter 148, a 2-input multiplexer 149 for digital signals, a digital subtractor 14A and a clocked digital delay line 14B. The FIR filter 141 is operated in the channel-equalization filtering 14 as a feed-forward FIR filter for suppressing near ghosts. The feed-forward FIR filter 141 helps suppress pre-ghosts, multipath responses that are received earlier than the principal DTV signal is received. The subtractor 143, a path through the adder 146, the sample-rate-reduction filter 147, the data slicer 15, the sample-rate-increase filter 148 and the FIR filter 144 are connected in a feedback loop to provide an infinite-impulse-response (IIR) filter. The FIR filter 144, which has filtering coefficients stored in a temporary storage register 145, is operated as a feedback FIR filter in this IIR filter. This IIR filter helps suppress post-ghosts, multipath responses that are received later than the principal DTV signal is received.

The FIG. 27 channel-equalization filtering 14 is a fractional equalizer in which the FIR filters 141 and 144 are clocked at a rate higher than symbol rate. This higher sample rate may, by way of specific examples, be twice symbol rate or four-thirds symbol rate. To preserve digital bandwidth in decision feedback, the decision-feedback error detector 24 operates at this higher sample rate when comparing the channel-equalization filtering 14 output signal with that output signal after quantization. The sample-rate-reduction filter 147 reduces the sample rate of the channel-equalization filtering 14 output signal to symbol rate for application to the data slicer 15, and the sample-rate-increase filter 148 re-samples the quantized channel-equalization filtering 14 output signal to the higher sample rate to supply the decision-feedback error detector 24 signal against which it can compare the channel-equalization filtering 14 output signal as generated at that higher sample rate.

The IIR filter loop includes a path through the adder 146, which receives the difference output signal from the subtractor 143 as a first of two summand input signals. The adder 146 is used to implement filtering that suppresses artifacts arising from demodulation of the video carrier and chroma subcarrier of co-channel interfering NTSC signal. Estimates have previously generated of the signal needed to counteract these artifacts as they would appear in the channel-equalization filtering 14 output signal if this signal were supplied directly from the subtractor 143. When a co-channel NTSC interference detector 30 indicates co-channel NTSC interference is occurring, this indication conditions the 2-input multiplexer 149 to supply the adder 143 these estimates as its second summand input signal. The adder 146 adds these estimates to the difference output signal from the subtractor 143 to generate channel-equalization filtering 14 output signal in which artifacts arising from demodulation of the video carrier and chroma subcarrier of co-channel interfering NTSC signal are reduced. When the detector 30 indicates co-channel NTSC interference is not occurring, this indication conditions the 2-input multiplexer 149 to apply an arithmetic zero to the adder 146 as its second summand input signal, for summing with the difference output signal from the subtractor 143 to generate channel-equalization filtering 14 output signal.

The estimates of the signal needed to counteract artifacts in the subtractor 143 difference output signal that arise from demodulation of the video carrier and chroma subcarrier of co-channel interfering NTSC signal are generated by the digital subtractor 14A six symbol epochs before their use. The estimates are delayed six symbol epochs in a clocked digital delay line 14B for selective application by the multiplexer 149 to the adder 146 as its second summand input signal.

Alternatively, estimates of the signal needed to counteract artifacts arising from demodulation of the video carrier and chroma subcarrier of co-channel interfering NTSC signal, as these artifacts would appear in the channel-equalization filtering 14 output signal if this signal were supplied directly from the subtractor 143, can be generated from times 1368 symbol epochs (two NTSC scan line intervals) earlier; 179,208 symbol epochs (262 NTSC scan line intervals) earlier; or 718,200 symbol epochs (two NTSC frame intervals) earlier. Arrangements to determine which estimate is probably the most accurate and to select it as the second summand input signal for the adder 146 are also possible. Such arrangements are described more completely in allowed U.S. patent application Ser. No. 09/120,721 filed Aug. 2, 1999 for A. L. R. Limberg and titled "DIGITAL TELEVISION RECEIVER WITH ADAPTIVE FILTER CIRCUITRY FOR SUPPRESSING NTSC CO-CHANNEL INTERFERENCE"; in U.S. Pat. No. 5,748,226 issued May 5, 1998 to A. L. R. Limberg and titled "DIGITAL TELEVISION RECEIVER WITH ADAPTIVE FILTER CIRCUITRY FOR SUPPRESSING NTSC CO-CHANNEL INTERFERENCE"; in U.S. Pat. No. 5,835,131 issued Nov. 10, 1998 to A. L. R. Limberg and titled "DIGITAL TELEVISION RECEIVER WITH ADAPTIVE FILTER CIRCUITRY FOR SUPPRESSING NTSC CO-CHANNEL INTERFERENCE"; and in U.S. Pat. No. 5,801,759 issued Sep. 1, 1998 to A. L. R. Limberg and titled "DIGITAL TV RECEIVER CIRCUITRY FOR DETECTING AND SUPPRESSING NTSC CO-CHANNEL INTERFERENCE".

Adaptive fractional equalizers are described in greater detail by A. L. R. Limberg and C. B. Patel in U.S. patent application Ser. No. 09/373,588 filed Aug. 13, 1999 and titled "ADAPTIVE FRACTIONALLY SPACED EQUALIZER FOR RECEIVED RADIO TRANSMISSIONS WITH DIGITAL CONTENT, SUCH AS DTV SIGNALS". The output signal from the rate-reduction filter 147 in the adaptive channel-equalization filtering 140 is suitable for application to a Viterbi decoder for decoding the trellis coding of the ATSC DTV signal using a soft-decision decoding technique. Alternatively, the output signal from the data slicer 15 is used for implementing a hard-decision decoding technique.

What is claimed is:

1. A digital television receiver for digital television signals, each having a suppressed carrier modulated in accordance with a symbol code and being subject to being accompanied by co-channel interfering analog television signal, said digital television receiver comprising:

radio-frequency reception apparatus for responding to a selected digital television signal to supply final intermediate frequency signal in a frequency band not extending higher than the high-frequency range;

an analog frequency-selective filter for responding to a digital television signal component of said final intermediate frequency signal, but not to an audio carrier component of said co-channel interfering analog television signal; and synchrodyning circuitry for recovering from said frequency-selective filter response digitized baseband symbol code corresponding to the symbol code contained within said digital television signal.

2. The digital television receiver of claim 1, wherein said analog frequency-selective filter comprises an RLC analog filter.

3. The digital television receiver of claim 2, wherein said RLC analog filter is a bifilar-T trap filter.

4. The digital television receiver of claim 1, wherein said analog frequency-selective filter comprises a surface-acoustic-wave filter for bandpass filtering said final intermediate frequency signal.

5. A digital television receiver for digital television signals, each having a suppressed carrier modulated in accordance with a symbol code and being subject to being accompanied by co-channel interfering analog television signal, said digital television receiver comprising:

radio-frequency reception apparatus for responding to a selected digital television signal to supply final intermediate frequency signal in a frequency band not extending higher than the high-frequency range;

a frequency-selective filter for responding to a digital television signal component of said final intermediate frequency signal, but not to an audio carrier component of said co-channel interfering analog television signal; and synchrodyning circuitry for recovering from said frequency-selective filter response digitized baseband symbol code corresponding to the symbol code contained within said digital television signal;

wherein said frequency-selective filter comprises:

a surface-acoustic-wave filter for selectively responding to the audio carrier of said co-channel interfering analog television signal component of said final intermediate frequency signal; and circuitry for combining the response of said surface-acoustic-wave filter with said final intermediate frequency signal for suppressing the audio carrier of said co-channel interfering analog television signal component therein.

6. A digital television receiver comprising:

a first converter for converting a selected digital television signal to an initial intermediate frequency signal, said selected digital television signal having a suppressed carrier modulated in accordance with a symbol code and being accompanied by a pilot carrier of the same frequency as said suppressed carrier;

an intermediate-frequency amplifier chain responsive to said initial intermediate frequency signal for supplying an amplified final intermediate frequency signal in a frequency band not extending higher than the high-frequency range, said intermediate-frequency amplifier chain including at least one further converter for down-converting said initial intermediate frequency signal to said frequency band;

an analog filter for generating a response to said amplified final intermediate frequency signal in which response the frequency-modulated audio carrier of co-channel NTSC analog television signal is suppressed, said analog filter response tending to exhibit non-uniformity in group delay;

a surface-acoustic-wave filter included in said intermediate-frequency amplifier chain exhibiting non-uniforrnity in group delay for counteracting the non-uniformity in group delay said analog filter response tends to exhibit; and synchrodyning circuitry for recovering from said analog filter response digitized baseband symbol code corresponding to the symbol code contained within said digital television signal.

7. The digital television receiver of claim 6, further comprising:

a channel equalization filter, receptive of the digitized baseband symbol code recovered by said synchrodyning circuitry, and operative for correcting any remnant non-uniformity in group delay exhibited in response from said channel equalization filter.

8. The digital television receiver of claim 6, wherein said circuitry for recovering the symbol code contained within said digital television signal comprises:

an analog-to-digital converter for digitizing said analog filter response;

a digital multiplier for multiplying the digitized analog filter response by a digital carrier to complete synchrodyning of said amplified final intermediate frequency signal to recover said digitized baseband symbol code.

9. The digital television receiver of claim 8, further comprising:

a channel equalization filter receptive of said digitized baseband symbol code and operative for correcting any remnant non-uniformity in group delay exhibited in response from said channel equalization filter.

10. The digital television receiver of claim 8, wherein said analog filter comprises a bridged-T trap filter for the frequency-modulated audio carrier of co-channel NTSC analog television signal.

11. The digital television receiver of claim 10, further comprising:

a channel equalization filter receptive of said digitized baseband symbol code and operative for correcting any remnant. non-uniformity in group delay exhibited in response from said channel equalization filter.

12. The digital television receiver of claim 8, wherein said analog filter comprises a bifilar-T trap filter for the frequency-modulated audio carrier of co-channel NTSC analog television signal.

13. The digital television receiver of claim 12, further comprising:

a channel equalization filter receptive of said digitized baseband symbol code and operative for correcting any remnant non-uniformity in group delay exhibited in response from said channel equalization filter.

14. The digital television receiver of claim 8, wherein said analog filter comprises a Butterworth-Thomson-transition high pass filter.

15. The digital television receiver of claim 14, further comprising:

a channel equalization filter receptive of said digitized baseband symbol code and operative for correcting any remnant non-uniformity in group delay exhibited in response from said channel equalization filter.

16. The digital television receiver of claim 8, wherein said analog filter comprises a Butterworth-Thomson-transition low pass filter.

17. The digital television receiver of claim 16, further comprising:

a channel equalization filter receptive of said digitized baseband symbol code and operative for correcting any remnant non-uniformity in group delay exhibited in response from said channel equalization filter.

18. The digital television receiver of claim 6, wherein said circuitry for recovering the symbol code contained within said digital television signal comprises:

a synchronous detector for synchronously detecting the analog filter response in accordance with a carrier to recover analog baseband symbol code corresponding to the symbol code contained within said digital television signal; and an analog-to-digital converter for digitizing said analog baseband symbol code to generate said digitized baseband symbol code.

19. The digital television receiver of claim 18, further comprising:

a channel equalization filter receptive of said baseband symbol code and operative for correcting any remnant non-uniformity in group delay exhibited in response from said channel equalization filter.

20. The digital television receiver of claim 18, wherein said analog filter comprises a bridged-T trap for the frequency-modulated audio carrier of co-channel NTSC analog television signal.

21. The digital television receiver of claim 20, further comprising:

a channel equalization filter receptive of said digitized baseband symbol code and operative for correcting any remnant non-uniformity in group delay exhibited in response from said channel equalization filter.

22. The digital television receiver of claim 18, wherein said analog filter comprises a bifilar-T trap for the frequency-modulated audio carrier of co-channel NTSC analog television signal.

23. The digital television receiver of claim 22, further comprising:

a channel equalization filter receptive of said digitized baseband symbol code and operative for correcting any remnant non-uniformity in group delay exhibited in response from said channel equalization filter.

24. The digital television receiver of claim 18, wherein said analog filter comprises a Butterworth-Thomson-transition high pass filter.

25. The digital television receiver of claim 24, further comprising:

a channel equalization filter receptive of said digitized baseband symbol code and operative for correcting any remnant non-uniformity in group delay exhibited in response from said channel equalization filter.

26. The digital television receiver of claim 18, wherein said analog filter comprises a Butterworth-Thomson-transition low pass filter.

27. The digital television receiver of claim 26, further comprising:

a channel equalization filter receptive of said digitized baseband symbol code and operative for correcting any remnant non-uniformity in group delay exhibited in response from said channel equalization filter.

28. In a digital television receiver that includes a tuner and first converter, intermediate frequency amplifier circuitry employing surface-acoustic-wave filtering to selectively amplify a selected channel of digital television signal as supplied from said first converter to generate an amplified penultimate intermediate-frequency signal, a further converter for converting said penultimate intermediate-frequency signal to a final intermediate-frequency signal, and demodulator circuitry for demodulating said final intermediate-frequency signal, the improvement comprising:

analog RLC filtering of said final intermediate-frequency signal for suppressing co-channel NTSC audio carrier; and said surface-acoustic-wave filtering being of a design that substantially compensates for delay distortion caused by said analog RLC filtering of said final intermediate-frequency signal for suppressing co-channel NTSC audio carrier.

29. The digital television receiver of claim 28, wherein said circuitry for demodulating said final intermediate-frequency signal is preceded by an analog-to-digital converter for digitizing said final intermediate-frequency signal, and wherein said circuitry for demodulating said final intermediate-frequency signal is of a type performing demodulation in the digital regime.

30. The digital television receiver of claim 28, wherein said circuitry for demodulating said final intermediate-frequency signal is of a type performing demodulation in the analog regime.

31. An improved digital television receiver as set forth in claim 28, wherein said analog RLC filtering comprises a bridged-T trap filter.

32. An improved digital television receiver as set forth in claim 28, wherein said analog RLC filtering comprises a bifilar-T trap filter.

33. An improved digital television receiver as set forth in claim 28, wherein said analog RLC filtering comprises a Butterworth-Thomson-transition low pass filter.

34. An improved digital television receiver as set forth in claim 28, wherein said analog RLC filtering comprises a Butterworth-Thomson-transition high pass filter.

35. A digital television receiver comprising:

a first converter for converting a selected digital television signal to an initial intermediate frequency signal, said selected digital television signal having a suppressed carrier modulated in accordance with a symbol code and being accompanied by a pilot carrier of the same frequency as said suppressed carrier;

an intermediate-frequency amplifier chain responsive to said initial intermediate frequency signal for supplying an amplified final intermediate frequency signal in a frequency band not extending higher than the high-frequency range, said intermediate-frequency amplifier chain including at least one further converter for down-converting said initial intermediate frequency signal to said frequency band;

a surface-acoustic-wave filter for supplying a response to said amplified final intermediate frequency signal; and demodulator circuitry for demodulating said amplified final intermediate frequency signal in which response the frequency-modulated audio carrier of co-channel NTSC analog television signal is suppressed supplied from said surface-acoustic-wave filter as the response thereof.

36. The digital television receiver of claim 35, in which said surface-acoustic-wave filter for supplying a response to said amplified final intermediate frequency signal supplies a response to said response the frequency-modulated audio carrier of co-channel NTSC analog television signal is suppressed.

37. The digital television receiver of claim 36, wherein said circuitry for demodulating said final intermediate-frequency signal is preceded by an analog-to-digital converter for digitizing said final intermediate-frequency signal, and wherein said circuitry for demodulating said final intermediate-frequency signal is of a type performing demodulation in the digital regime.

38. The digital television receiver of claim 37, wherein said circuitry for demodulating said final intermediate-frequency signal is of a type performing demodulation in the analog regime.

39. The digital television receiver of claim 35, wherein said circuitry for demodulating said final intermediate-frequency signal is preceded by an analog-to-digital converter for digitizing said final intermediate-frequency signal, and wherein said circuitry for demodulating said final intermediate-frequency signal is of a type performing demodulation in the digital regime.

40. The digital television receiver of claim 35, wherein said circuitry for demodulating said final intermediate-frequency signal is of a type performing demodulation in the analog regime.

* * * * *